United States Patent
Kolman et al.

(10) Patent No.: US 8,875,267 B1
(45) Date of Patent: Oct. 28, 2014

(54) ACTIVE LEARNING-BASED FRAUD DETECTION IN ADAPTIVE AUTHENTICATION SYSTEMS

(75) Inventors: Eyal Kolman, Tel-Aviv (IL); Alon Kaufman, Bnei-Dror (IL); Yael Villa, Tel-Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,120

(22) Filed: Jun. 29, 2012

(51) Int. Cl.
*G06F 21/00* (2013.01)

(52) U.S. Cl.
USPC .......... 726/7; 726/2; 726/4; 726/14; 709/203; 713/166; 713/170

(58) Field of Classification Search
CPC ................................. G06F 21/50; G06F 21/53
USPC .................... 726/3, 7; 713/166, 170
See application file for complete search history.

(56) References Cited

U.S. PATENT DOCUMENTS

| | | | | |
|---|---|---|---|---|
| 7,908,644 | B2 * | 3/2011 | Roskind et al. | 726/3 |
| 8,370,389 | B1 * | 2/2013 | Dotan | 707/784 |
| 2005/0097320 | A1 * | 5/2005 | Golan et al. | 713/166 |

* cited by examiner

*Primary Examiner* — Jason Lee
(74) *Attorney, Agent, or Firm* — Ryan, Mason & Lewis, LLP

(57) ABSTRACT

Active learning-based fraud detection techniques are provided in adaptive authentication systems. An authentication request from an authentication requestor is processed by receiving the authentication request from the authentication requester; comparing current data for the user associated with the user identifier with historical data for the user; generating an adaptive authentication result based on the comparison indicating a likelihood current user data is associated with a fraudulent user; and performing one or more additional authentication operations to improve learning if the request satisfies one or more predefined non-risk based criteria. The predefined non-risk based criteria comprises, for example, (i) the request receiving a riskiness score below a threshold based on current data and wherein the request was expected to have a risk score above a threshold, or (ii) the request being in a bucket having a number of tagged events below a threshold.

18 Claims, 2 Drawing Sheets

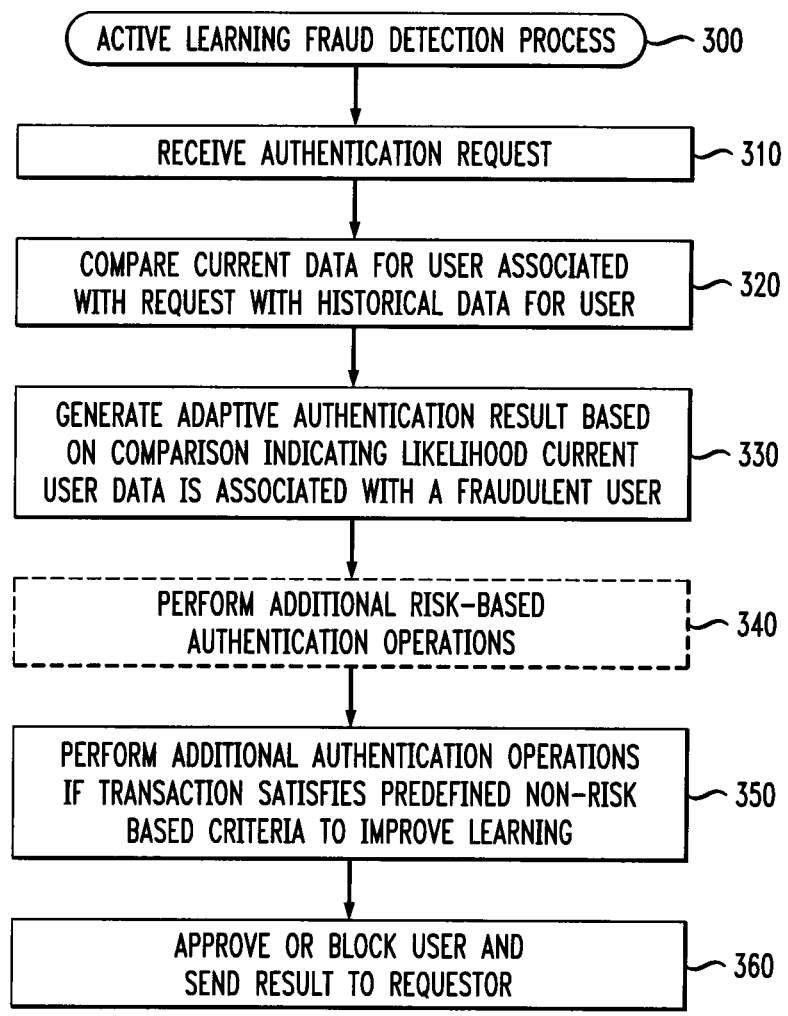

ACTIVE LEARNING-BASED FRAUD DETECTION IN ADAPTIVE AUTHENTICATION SYSTEMS

FIELD OF THE INVENTION

The present invention relates generally to techniques for detecting fraud in network communication systems.

BACKGROUND OF THE INVENTION

Service providers receive login attempts from users wishing to gain access to sensitive information, such as bank accounts. Some users attempt to gain access to such information with credentials obtained fraudulently from a legitimate account holder.

Adaptive authentication techniques identify fraudulent users even though such users possess credentials to gain access to a legitimate user's account information. For example, each login attempt is received at the service provider at a particular time, and in many cases, a fraudulent user will send login attempts at times outside of those expected by a service provider. Existing adaptive authentication techniques compare information associated with a login attempt received by the service provider, such as the time of the login and a location from where the login originated, with a historical record of a typical user who exhibits some expected login behavior. For example, if a high percentage of prior login attempts received by the service provider from a particular user occur between the hours of 6 AM and 11 PM daily and from locations within the continental United States, then login attempts between 2 AM and 4 AM from locations across Eastern Europe, have a high risk of being a fraudulent user.

Adaptive authentication techniques apply a challenge to such risky transactions, where the riskiness estimation arrives from a fraud/genuine classifier. The answer to the challenge (e.g., a pass/fail result) is used to classify the transaction as being genuine or fraudulent and possibly to improve the accuracy of the model within a learning method, such as a Bayesian methodology. Hence, challenges mostly affect the classification of the specific transaction that invoked the challenge and the classifier results over non-challenged events are not necessarily improved.

A need therefore exists for techniques for improving classifier results in an Adaptive Authentication system.

SUMMARY OF THE INVENTION

The present invention in the illustrative embodiments described herein provides active learning-based fraud detection in adaptive authentication systems. In accordance with an aspect of the invention, a method is provided for processing an authentication request from an authentication requestor. The method comprises the steps of: receiving the authentication request from the authentication requester; comparing current data for the user associated with the user identifier with historical data for the user; generating an adaptive authentication result based on the comparison indicating a likelihood current user data is associated with a fraudulent user; and performing one or more additional authentication operations to improve learning if the request satisfies one or more predefined non-risk based criteria.

In an exemplary embodiment, additional risk-based authentication operations are performed based on the comparison. The predefined non-risk based criteria comprises, for example, the request receiving a riskiness score below a threshold based on current data and wherein the request was expected to have a risk score above a threshold. For example, the expected risk score can be based on prior domain knowledge and/or distributions over similar data. In another exemplary embodiment, the predefined non-risk based criteria comprises, for example, the request being in a bucket having a number of tagged events below a threshold. For example, the bucket can have a number of members that exceeds a threshold.

The fraud detection techniques of the illustrative embodiments overcome one or more of the problems associated with the conventional techniques described previously, and provide improved security by incorporating an active learning mechanism to improve classifier results. These and other features and advantages of the present invention will become more readily apparent from the accompanying drawings and the following detailed description.

BRIEF DESCRIPTION OF THE DRAWINGS

FIG. 3 is a flow chart describing an exemplary implementation of an active learning fraud detection process that incorporates aspects of the present invention.

DETAILED DESCRIPTION

Figure 1:
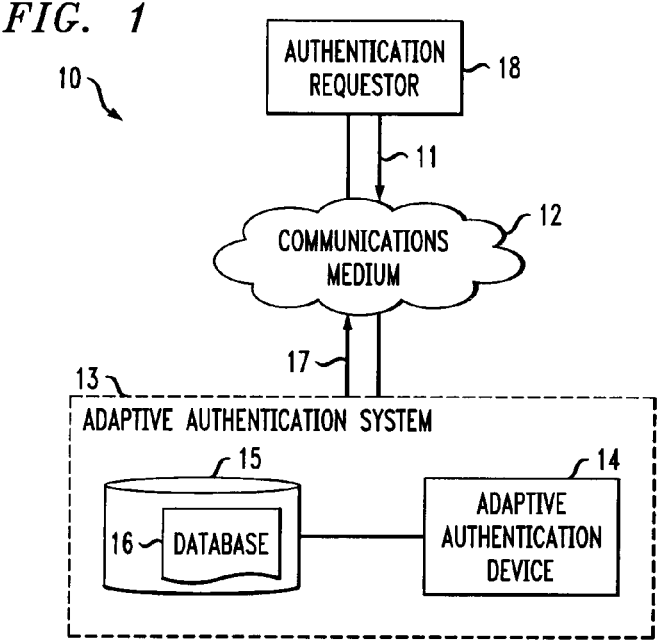
FIG. 1 is a schematic diagram illustrating an electronic environment in which the present invention can be implemented.

The present invention provides active learning-based fraud detection in Adaptive Authentication (AA) systems. According to one aspect of the invention, an Adaptive Authentication system includes an active learning mechanism to improve classifier results. Active learning is employed to identify transactions where a further challenge (i.e., query) should be issued to improve the classifier results. Generally, conventional learning techniques select transactions to challenge based on a risk assessment of the transaction. The answer to the challenge is typically applied to an adapting algorithm, and the classifier is modified using supervised learning to fit the new information.

According to a further aspect of the invention, transactions are selected for further challenge if they satisfy one or more predefined non-risk based criteria to improve the learning of the system (and not based solely on a risk assessment of the transaction). In this manner, the detection accuracy of the Adaptive Authentication system is improved, with a reduction of false positives.

For example, a predefined non-risk based criteria to improve the learning of the system comprises events that receive low riskiness score based on the current data, while they were expected to have high risk scores (e.g., based on prior domain knowledge or on distributions over other similar data). This disagreement may indicate that the model is not accurate. Tagging these events through further challenges may either update the model and correct any inconsistencies, or keep the model unchanged but increase our confidence level of the system's scores.

Similarly, another predefined non-risk based criteria to improve the learning of the system comprises buckets with relatively few or no tagged events. Such buckets yield scores with low confidence, as the score is primarily based on prior knowledge and less on actual data. Events that fall in buckets with poor tagging and large population would be challenged in accordance with an aspect of the present invention. The tagged result will improve the confidence level of these buckets, and since many events fall into these buckets, risk assessment accuracy is significantly increased. This approach is motivated by the "Maximum Curiosity" principle—choosing to query on samples that will most improve the classifier accuracy.

Since challenges are relatively costly, the present invention provides a mechanism that balances launching a challenge such that the overall classification improvement is maximized. Accordingly, active learning is used to suggest which additional events should be challenged based on the non-risk based criteria, in addition to those already challenged using risk based criteria. In existing Adaptive Authentication systems, challenges are drawn based on a local perspective (i.e., the riskiness of a given event). The present invention launches a challenge based on a global perspective (i.e., using active learning to initiate challenges on the basis of an overall classification criterion).

FIG. 1 illustrates an electronic environment 10 for carrying out the improved technique. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols, such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, a baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved technique and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
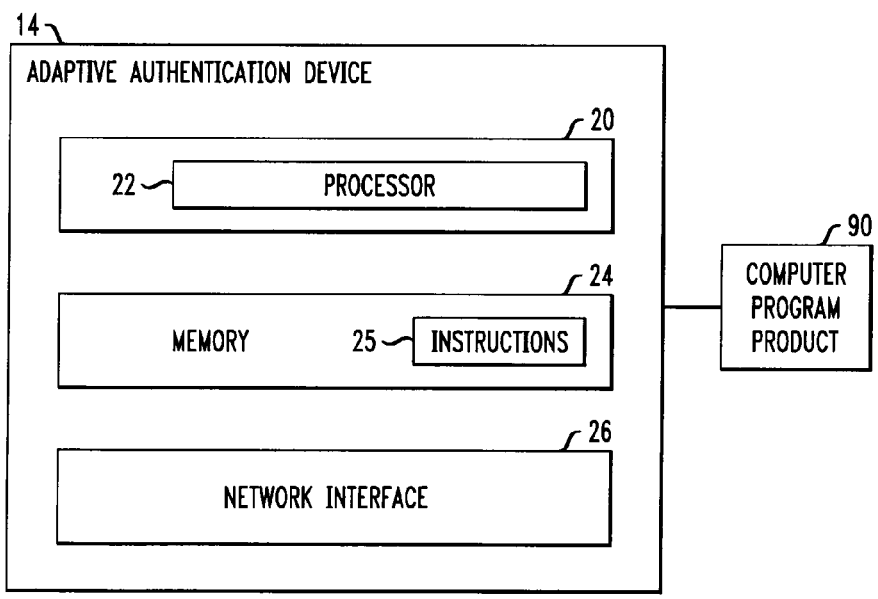
FIG. 2 is a schematic diagram illustrating an adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Processor 22 then combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or U.S. Pat. No. 8,370,389, entitled "Techniques for Authenticating Users of Massive Multiplayer Online Role Playing Games Using Adaptive Authentication," each incorporated by reference herein.

FIG. 3 is a flow chart describing an exemplary implementation of an active learning fraud detection process 300 that incorporates aspects of the present invention. As shown in FIG. 3, the exemplary active learning fraud detection process 300 initially receives an authentication request during step 310 from the authentication requestor 18. The active learning fraud detection process 300 then compares the current user data for the user associated with the request with the historical data for this user during step 320, in a known manner. Such operations may involve analyzing a user's attributes (e.g., the user's device address, ISP address, location, etc.). Additionally, such operations may involve analyzing certain behavior characteristics of the user's sessions (e.g., a comparison of time of day, length of session, purchase habits, and other activity). Accordingly, the adaptive authentication server 14 is able to evaluate potential risks of fraud (i.e., generate risk scores) and provide input back to the requester 18 to allow the requester 18 to take action (e.g., contact the user, temporarily deny/disable the user's account, etc.).

An adaptive authentication result is generated during step 330 based on the comparison indicating a likelihood that the current user data is associated with a fraudulent user 330.

The adaptive authentication server 14 optionally performs additional risk-based authentication operations during step 340. For example, the adaptive authentication server 14 can issue an out-of-band challenge to the user through the out-of-band device (not shown). The out-of-band challenge requires that the user provide an out-of-band response using the out-of-band device (e.g., a cell phone, email, SMS, etc.). In some arrangements, the challenge is a user specific question that only the user should be able to answer.

The active learning fraud detection process 300 performs additional authentication operations in accordance with the present invention during step 350 if the transaction satisfies one or more predefined non-risk based criteria to improve learning. The additional authentication operations performed during step 350 can be similar to those optional operations discussed above in conjunction with step 340. For example, a predefined non-risk based criteria to improve learning comprises events that receive a low riskiness score during step 320 based on the current data, while they were expected to have high risk scores (e.g., based on prior domain knowledge or on distributions over other similar data), suggesting that the model is not accurate. Tagging these events through further challenges during step 350 may either update the model and correct any inconsistencies, or keep the model unchanged but increase our confidence level of the system's scores.

Similarly, another predefined non-risk based criteria to improve learning comprises the transaction being in a bucket with relatively few or no tagged events. Such buckets yield scores with low confidence, as the score is primarily based on prior knowledge and less on actual data. Events that fall in buckets with poor tagging and large population would be challenged in accordance with an aspect of the present invention. The tagged result will improve the confidence level of these buckets, and since many events fall into these buckets, risk estimation accuracy is significantly increased. This approach is motivated by the "Maximum Curiosity" principle—choosing to query on samples that will most improve the classifier accuracy.

Next, the adaptive authentication server 14 makes a decision during step 360 whether to approve or block the user, and sends the result of that decision to the requestor 18. Upon receipt of the decision, the requestor 18 either approves or blocks access. Such operation may include creation of a ticket for follow-up by a fraud department.

Additionally, the adaptive authentication server 14 updates its records in the user database 16 with data gathered during the user login attempt. Such information may include identification information of a new user device, a new location, a new access time, etc. Generally, the answer to the challenge is typically applied to an adapting algorithm and the classifier can be modified using supervised learning techniques to fit the new information.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14 which identifies particular events for alerting within event notification management system. Some embodiments are directed to adaptive authentication device 14. Some embodiments are directed to a system which processes an authentication request from an authentication requestor. Some embodiments are directed to a method of processing an authentication request from an authentication requestor. Also, some embodiments are directed to a computer program product which enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus, such as CD-ROM, flash memory, disk memory, tape memory, and the like.

As mentioned previously herein, the above-described embodiments of the invention are presented by way of illustrative example only. Numerous variations and other alternative embodiments may be used.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in the figures and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for processing an authentication request for one or more risk-based authentication operations from an authentication requestor, the authentication request including a user identifier and current user data, the method comprising:
   receiving the authentication request from said authentication requester;
   comparing the current data for the user associated with the user identifier with historical data for the user;
   generating an adaptive authentication result based on said comparison indicating a likelihood that the current user data is associated with a fraudulent user; and
   performing one or more additional authentication operations in addition to said one or more risk-based authentication operations to improve learning if said authentication request satisfies one or more predefined non-risk based criteria based on a confidence of a riskiness score associated with said authentication request relative to a confidence threshold, wherein said one or more predefined non-risk based criteria are not dependent on a risk associated with said authentication request and wherein said one or more additional authentication operations are used to update an adaptive authentication model, wherein at least one of said steps are performed by at least one hardware device.

2. The method of claim 1, further comprising the step of performing one or more additional risk-based authentication operations based on said comparison.

3. The method of claim 1, wherein said one or more predefined non-risk based criteria comprises said authentication request receiving said riskiness score below a risk threshold based on the current user data and wherein said authentication request was expected to have an expected riskiness score above said risk threshold.

4. The method of claim 3, wherein said expected riskiness score is based on one or more of prior domain knowledge and distributions over similar data to the current user data.

5. The method of claim 1, wherein said one or more predefined non-risk based criteria comprises said authentication request being in a bucket having a number of tagged events below said confidence threshold, wherein said confidence of said riskiness score of said bucket is below said confidence threshold.

6. The method of claim 5, wherein said bucket has a number of members that exceeds a threshold.

7. An apparatus for processing an authentication request for one or more risk-based authentication operations from an authentication requestor, the apparatus comprising:
   a memory; and
   at least one hardware device, coupled to the memory, operative to:
   receive the authentication request from said authentication requester;
   comparing the current data for the user associated with the user identifier with historical data for the user;
   generate an adaptive authentication result based on said comparison indicating a likelihood that the current user data is associated with a fraudulent user; and
   perform one or more additional authentication operations in addition to said one or more risk-based authentication operations to improve learning if said authentication request satisfies one or more predefined non-risk based criteria based on a confidence of a riskiness score associated with said authentication request relative to a confidence threshold, wherein said one or more predefined non-risk based criteria are not dependent on a risk associated with said authentication request and wherein said one or more additional authentication operations are used to update an adaptive authentication model, wherein at least one of said steps are performed by at least one hardware device.

8. The apparatus of claim 7, wherein said at least one hardware device is further configured to perform one or more additional risk-based authentication operations based on said comparison.

9. The apparatus of claim 7, wherein said one or more predefined non-risk based criteria comprises said authentication request receiving said riskiness score below a risk threshold based on the current user data and wherein said authentication request was expected to have an expected riskiness score above said risk threshold.

10. The apparatus of claim 9, wherein said expected riskiness score is based on one or more of prior domain knowledge and distributions over similar data to the current user data.

11. The apparatus of claim 7, wherein said one or more predefined non-risk based criteria comprises said authentication request being in a bucket having a number of tagged events below said confidence threshold, wherein said confidence of said riskiness score of said bucket is below said confidence threshold.

12. The apparatus of claim 11, wherein said bucket has a number of members that exceeds a threshold.

13. An article of manufacture for processing an authentication request for one or more risk-based authentication operations from an authentication requestor, comprising a non-transitory machine readable recordable medium containing one or more programs which when executed implement the steps of:
   receiving the authentication request from said authentication requester;
   comparing the current data for the user associated with the user identifier with historical data for the user;
   generating an adaptive authentication result based on said comparison indicating a likelihood that the current user data is associated with a fraudulent user; and
   performing one or more additional authentication operations in addition to said one or more risk-based authentication operations to improve learning if said authentication request satisfies one or more predefined non-risk based criteria based on a confidence of a riskiness score associated with said authentication request relative to a confidence threshold, wherein said one or more predefined non-risk based criteria are not dependent on a risk associated with said authentication request and wherein said one or more additional authentication operations are used to update an adaptive authentication model, wherein at least one of said steps are performed by at least one hardware device.

14. The article of manufacture of claim 13, further comprising the step of performing one or more additional risk-based authentication operations based on said comparison.

15. The article of manufacture of claim 13, wherein said one or more predefined non-risk based criteria comprises said authentication request receiving said riskiness score below a risk threshold based on the current user data and wherein said authentication request was expected to have an expected riskiness score above said risk threshold.

16. The article of manufacture of claim 15, wherein said expected riskiness score is based on one or more of prior domain knowledge and distributions over similar data to the current user data.

17. The article of manufacture of claim 13, wherein said one or more predefined non-risk based criteria comprises said authentication request being in a bucket having a number of tagged events below said confidence threshold, wherein said confidence of said riskiness score of said bucket is below said confidence threshold.

18. The article of manufacture of claim 17, wherein said bucket has a number of members that exceeds a threshold.

\* \* \* \* \*